(12) United States Patent
Wiedmann et al.

(10) Patent No.: US 11,807,021 B2
(45) Date of Patent: Nov. 7, 2023

(54) FLUORESCENT PRINTING ON FABRIC FOR USE AS CONTROL INPUT TO AUTOMATED POSITIONING EQUIPMENT

(71) Applicant: Southwest Research Institute, San Antonio, TX (US)

(72) Inventors: Stephen Wiedmann, San Antonio, TX (US); Victoria Wahlen, San Antonio, TX (US); Branson Brockschmidt, San Antonio, TX (US)

(73) Assignee: Southwest Research Institute, San Antonio, TX (US)

( * ) Notice: Subject to any disclaimer, the term of this patent is extended or adjusted under 35 U.S.C. 154(b) by 101 days.

(21) Appl. No.: 17/584,595

(22) Filed: Jan. 26, 2022

(65) Prior Publication Data
US 2023/0234371 A1   Jul. 27, 2023

(51) Int. Cl.
| | |
|---|---|
| *B41J 3/407* | (2006.01) |
| *D06P 5/30* | (2006.01) |
| *G01N 21/64* | (2006.01) |
| *B41J 29/393* | (2006.01) |
| *C09D 11/50* | (2014.01) |

(52) U.S. Cl.
CPC .......... *B41J 3/4078* (2013.01); *B41J 29/393* (2013.01); *C09D 11/50* (2013.01); *D06P 5/30* (2013.01); *G01N 21/6447* (2013.01)

(58) Field of Classification Search
CPC ....... B41J 3/4078; B41J 29/393; C09D 11/50; D06P 5/30; G01N 21/6447
See application file for complete search history.

(56) References Cited

U.S. PATENT DOCUMENTS

| | | | |
|---|---|---|---|
| 9,868,302 B1 * | 1/2018 | Aminpour | .............. B41J 3/4078 |
| 10,814,516 B1 * | 10/2020 | Aminpour | .............. B26D 5/005 |

FOREIGN PATENT DOCUMENTS

CN           113015628 B   *   5/2023   ............ B41J 11/008

OTHER PUBLICATIONS

Dziesietnik , MachineTranslationofCN-113015628-B, 2023 (Year: 2023).*

* cited by examiner

*Primary Examiner* — Scott A Richmond
(74) *Attorney, Agent, or Firm* — Livingston Law Firm

(57) ABSTRACT

A method of using an automated system to position a fabric piece. A pattern is printed onto a fabric piece with fluorescent ink, and detected with a fluorescence-detecting camera, such as a UV camera. The detected pattern is stored in a controller as a pattern signature and compared to a stored target pattern. The results of the comparing step are used to generate control signals for the automated system to move the piece into the position of the target pattern.

18 Claims, 4 Drawing Sheets

FLUORESCENT PRINTING ON FABRIC FOR USE AS CONTROL INPUT TO AUTOMATED POSITIONING EQUIPMENT

TECHNICAL FIELD OF THE INVENTION

This patent application relates to automated processes for the textile industry, and more particularly to tracking the position of a fabric piece using a fluorescent pattern printed onto the fabric piece.

BACKGROUND OF THE INVENTION

The textiles industry has proven difficult to automate due to the flexible nature of fabric materials and multi-step production operations. In the apparel industry in particular, it has been difficult to transition from manually aided process enhancements to full automation.

Current innovations in automating the apparel industry depend on unit operations, where one step of the process is automated. One example of this is for sewing components together, such as sewing a pocket to pant fabric. The pocket fabric is separated from a stack and then fixtured to control its positioning. The fixture, being a rigid object, now serves as a carrier for the pocket fabric into an automated sewing station. Because the pocket fabric is positively secured in the fixture, the automated sewing station may use a fiducial on the carrier to initiate sewing the pocket to the pant.

This fixture/carrier approach to sewing lacks immediate adaptability to different component shapes and fabric materials. For instance, changing a sewn pattern may require new or modified carriers to capture and position the fabric for assembly. Although some systems use automated carrier loading, which reduces the level of manual interaction, a pattern-specific carrier is still needed to secure the material for assembly. In an industry with frequent fashion cycles and high product variability (including garment size), use of pattern-specific tooling stifles production efficiency and flexibility.

BRIEF DESCRIPTION OF THE DRAWINGS

A more complete understanding of the present embodiments and advantages thereof may be acquired by referring to the following description taken in conjunction with the accompanying drawings, in which like reference numbers indicate like features, and wherein.

DETAILED DESCRIPTION OF THE INVENTION

The following description is directed to an automated process for positioning a fabric piece for a subsequent operation such as sewing. A desired pattern is the basis for a "pattern signature", which is the fluorescent ink printing of a pattern on the fabric to be positioned. The pattern signature is read and used as control input to fabric positioning equipment. In the example of this description, the fluorescent pattern is detectable with ultraviolet light and is also referred to as a "UV-signature". However, other forms of fluorescent ink detection may be used.

For example, for sewing applications, the UV-signature is printed on a piece of fabric that is to be sewn with a seam or some other sewing operation. Automated equipment reads the UV-signature and positions the piece so that sewing may commence.

Applying, imaging, and analyzing UV-signatures on fabric substrates can provide several advantages to the textile industry. These advantages include but are not limited to providing accurate feedback to automation systems with the need for edge detection and allowing more flexible automation solutions not reliant on hard fixturing.

For sewing applications, a fabric piece can be positioned and/or tensioned. The invention provides improved sewing process quality through automated seam tracking. It supports changeover between a variety of patterns without large modifications to current hard automation production equipment.

Figure 1:
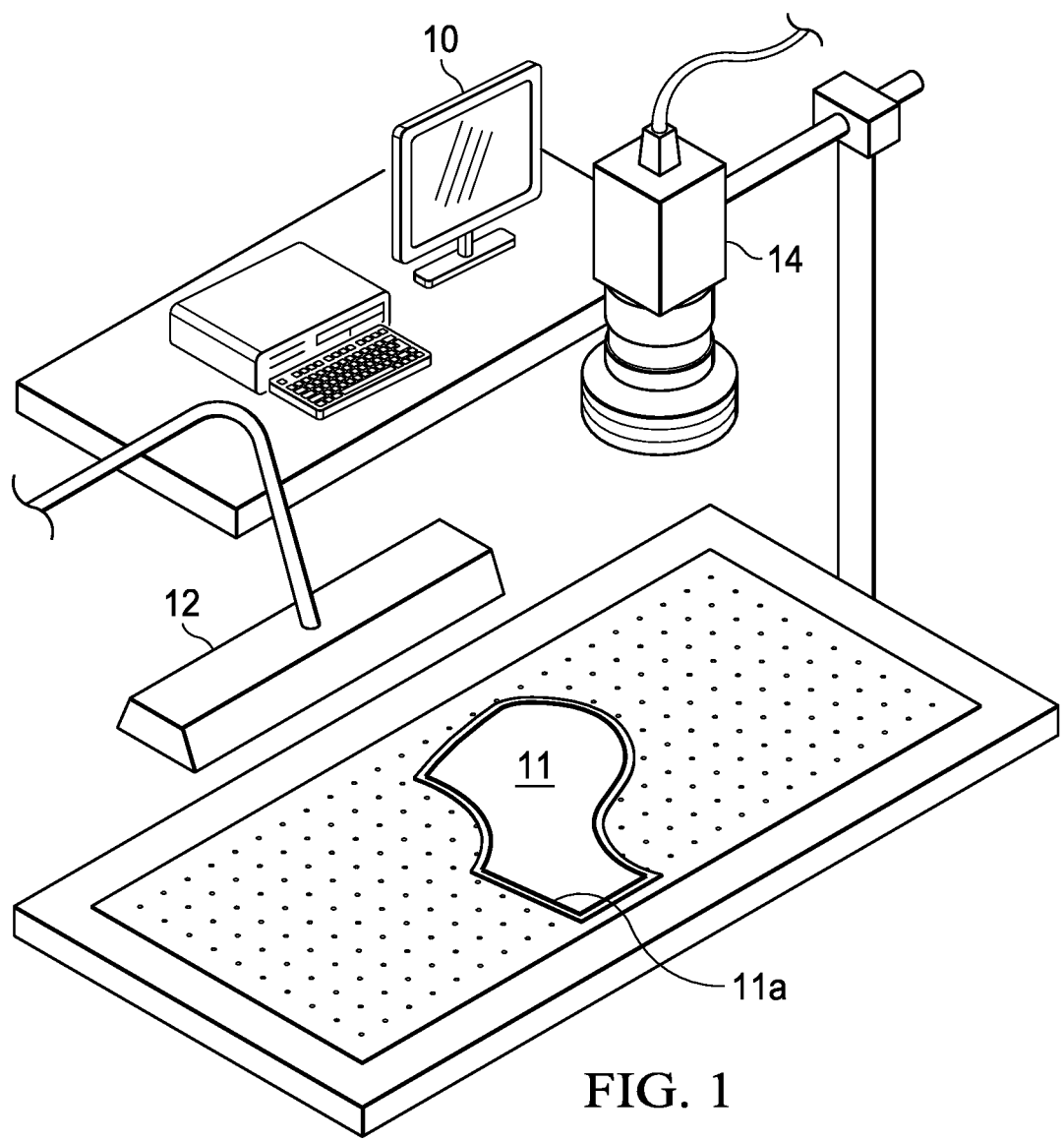
FIG. 1 illustrates a textiles process station for reading a pattern signature printed on a fabric piece.

FIG. 1 illustrates a textile station for imaging UV-signatures and using the imaging data for positioning fabric pieces. A controller 10 of automated positioning equipment is shown; the mechanisms of the positioning equipment is not explicitly illustrated. The positioning may be for sewing purposes or for some other fabric process step. The fabric may be tensioned as well as located in its proper place for sewing.

In the example of FIG. 1, the fabric piece 11 is to be sewn onto a fabric substrate and the pattern 11a is a seam pattern. It is assumed that the seam pattern 11a has been previously printed onto the fabric piece 11 using fluorescent ink. The fluorescent ink is invisible to the eye under normal light conditions, but visible to the eye or to a camera under a UV light (or other fluorescent ink detection means) with reduced ambient light intensity.

Printing the fluorescent ink through an inkjet print head is a suitable method of application but other application methods include stamps and precision nozzle delivery systems. The seam pattern represents a desired trajectory for a sewing machine and is referred to herein as the "UV-signature" for the desired seam.

Once the fluorescent ink is printed onto the fabric, the ink pattern on the pieces 11 can be viewed when illuminated by ultraviolet (UV) lamp 12 (365 nm wavelength). High-contrast images for pattern measurement and sewing process control are acquired by a digital camera 14, equipped with a narrow-band-pass filter matched to the fluorescence wavelength of the ink.

The image data is delivered to a positioning controller 10 that establishes and stores the UV-signature. As explained below, controller 10 comprises image analysis software that processes captured images to segment the fluorescent ink response from the fabric background. It is assumed that controller 10 has appropriate hardware and software to perform the tasks described herein.

Figure 2:
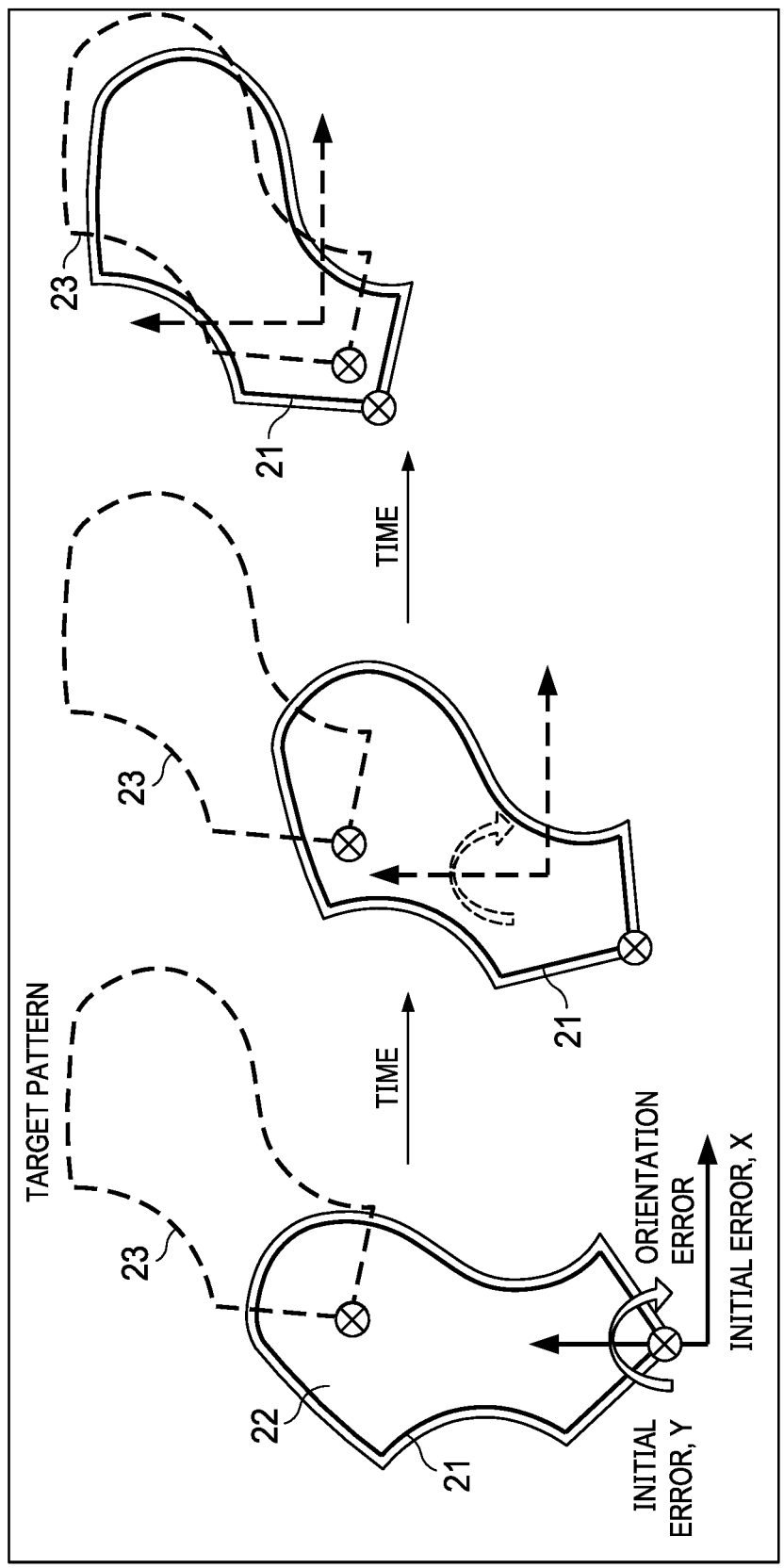
FIG. 2 illustrates the process of using a pattern signature to position a fabric piece.
Figure 2:
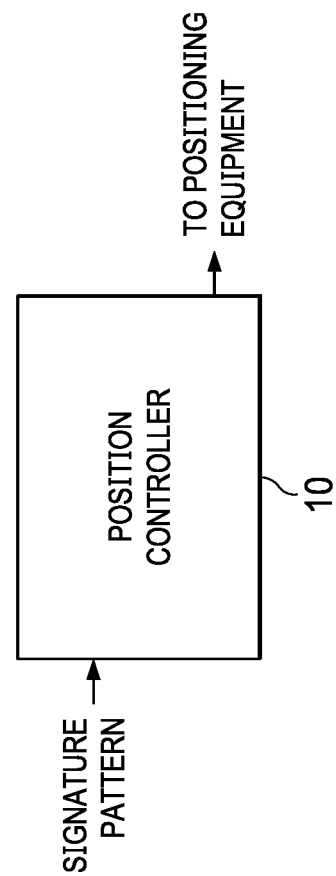

FIG. 2 illustrates three phases over time during the process of using a UV-signature 21 printed on a fabric piece 22 to position the fabric piece. In the example of FIG. 2, the desired seam has a closed geometry, but in practice a desired seam may have any geometry and may be as simple as a straight line. Also, in the example of FIG. 2, the fabric piece 22 is a pocket, and the pattern is a seam pattern for sewing the pocket to an apparel fabric substrate.

As explained above in connection with FIG. 1, the UV pattern has been printed on the piece 22 and has been read with a UV-detecting camera. The resulting UV-signature is stored as control input to automated fabric positioning equipment, the controller 10 of which is shown. The controller 10 also stores a target pattern to which the position of the UV-signature, and hence the position of the fabric piece 22, must be matched. The stored target pattern may be acquired by reading the pattern from the fabric piece 22.

In FIG. 2, it is further assumed that fabric piece 22 has been picked as a next workpiece for the automated equipment. That is, fabric piece 22 is moveable by the automated equipment into its correct position for sewing. The actual mechanics of the automated positioning equipment and how the fabric piece 22 is moved to its proper sewing position are not significant to the invention. Various types of robotics may be used.

Of significance is that control process 10 uses the UV-signature on fabric piece 22, delivered from camera 14, to locate the fabric piece 22 relative to the target pattern so that it may inform the positioning equipment how to move fabric piece 22 to the target pattern. As illustrated, the positioning equipment is thereby informed of a sewn seam trajectory to which the fabric piece must be matched. Thus, the object of the process of FIG. 2 is positioning of the fabric piece 22 so that its UV-signature matches the desired (target) pattern. Specifically, the seam trajectory measurement is processed to minimize error between the sewing trajectory and the desired (target) pattern.

As camera 14 reads the UV-signature and delivers position data to controller 10, controller 10 calculates position errors between the current position of the fabric piece 22 and the target pattern. In the example of FIG. 2, these are x, y, and orientation errors. Controller 10 informs the positioning equipment how much and in what direction to move fabric piece 22 so that it moves to the correct position.

As stated above, in the illustration of FIG. 2, the fabric to which piece 22 is to be sewn was already in its proper position. It should be understood that if two pieces are to be sewn together, the process may occur twice, once for each piece, so that they are each properly positioned.

As indicated above, in other embodiments, the method described above can be used to position fabric pieces for other than sewing purposes. Fabric may be tensioned as well as positioned using the method. The "pattern" need not be a seam and may be any pattern that can be used to provide both a target pattern and a UV-signature, and then used to align the UV-signature to the target.

Referring again to FIG. 1, images of a fluorescent ink pattern obtained by camera 14 can be processed in a variety of ways to extract the UV-signature for process control.

Figure 3:
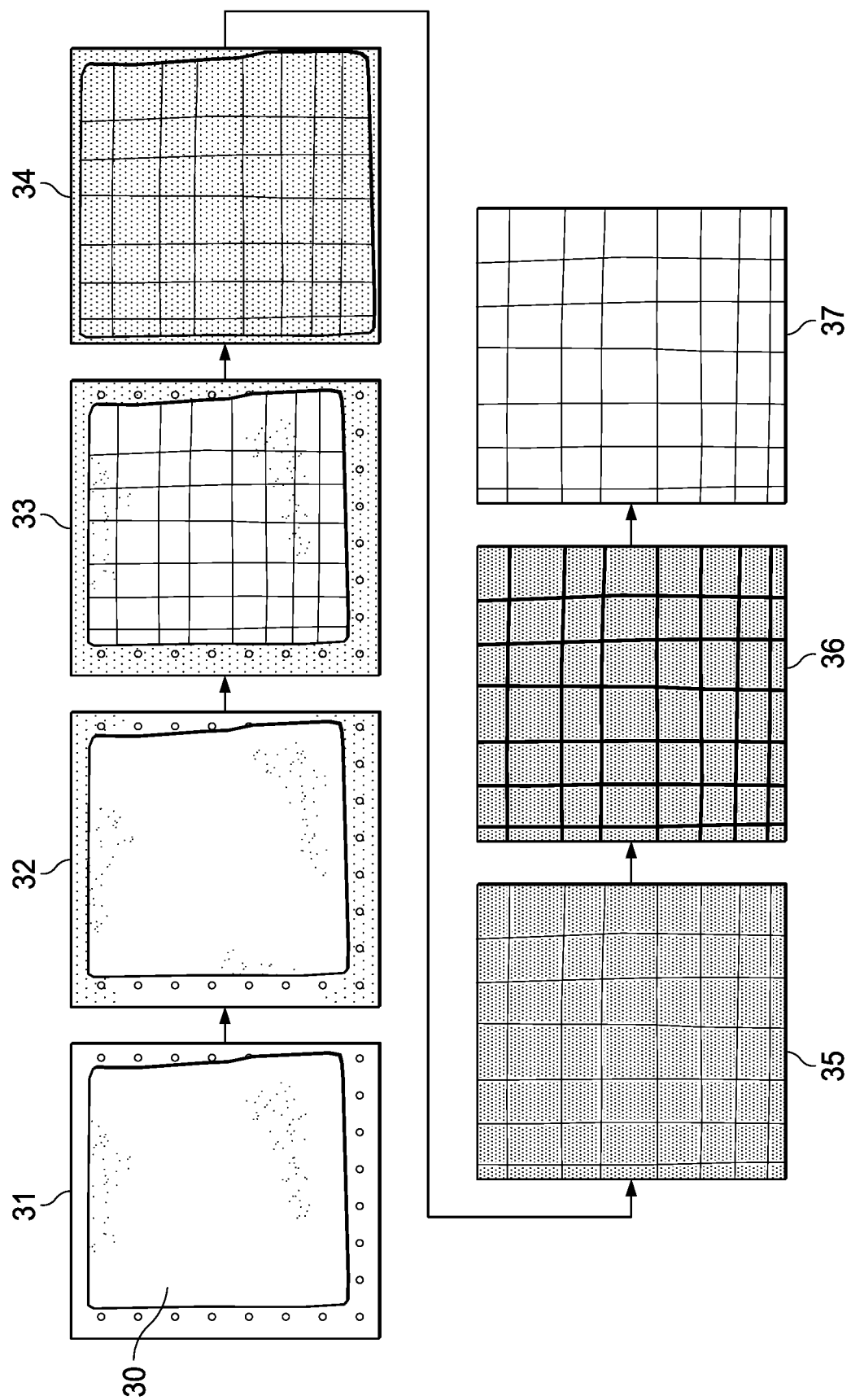
FIG. 3 illustrates the process of reading a pattern signature in further detail.

FIG. 3 illustrates one example of processing the UV image data to obtain a UV-signature. In the example of FIG. 3, the pattern is a grid pattern.

In Step 31, the grid pattern is printed with fluorescent ink on the fabric piece 30. In Step 32, the fabric piece is placed under camera 14. Camera 14 is equipped with an appropriate band-pass filter to acquire high-contrast images of the ink pattern; the fabric substrate is dark.

In Step 33, the ambient surroundings are darkened to enhance the fluorescent response of camera 14. In Step 34, an image is acquired with camera 14. In Step 35, process 15 digitally filters the image data, and in Step 36, the UV-signature is segmented from the background. Various morphological operations can be applied to improve the uniformity and reduce noise in the ink pattern image.

In Step 37, a skeletonization process locates center lines of printed markings. This precisely locates line centers within the ink pattern.

Image processing results can support low-level and high-level sewing process control objectives. Low-level measurement results include calculating path offsets, line tracking, pattern attributes, and area calculations. Higher-level feature measurements include determining the size of grid cells, distance between features, fabric distortion, and the absolute error between expected and recorded patterns.

Figure 4:
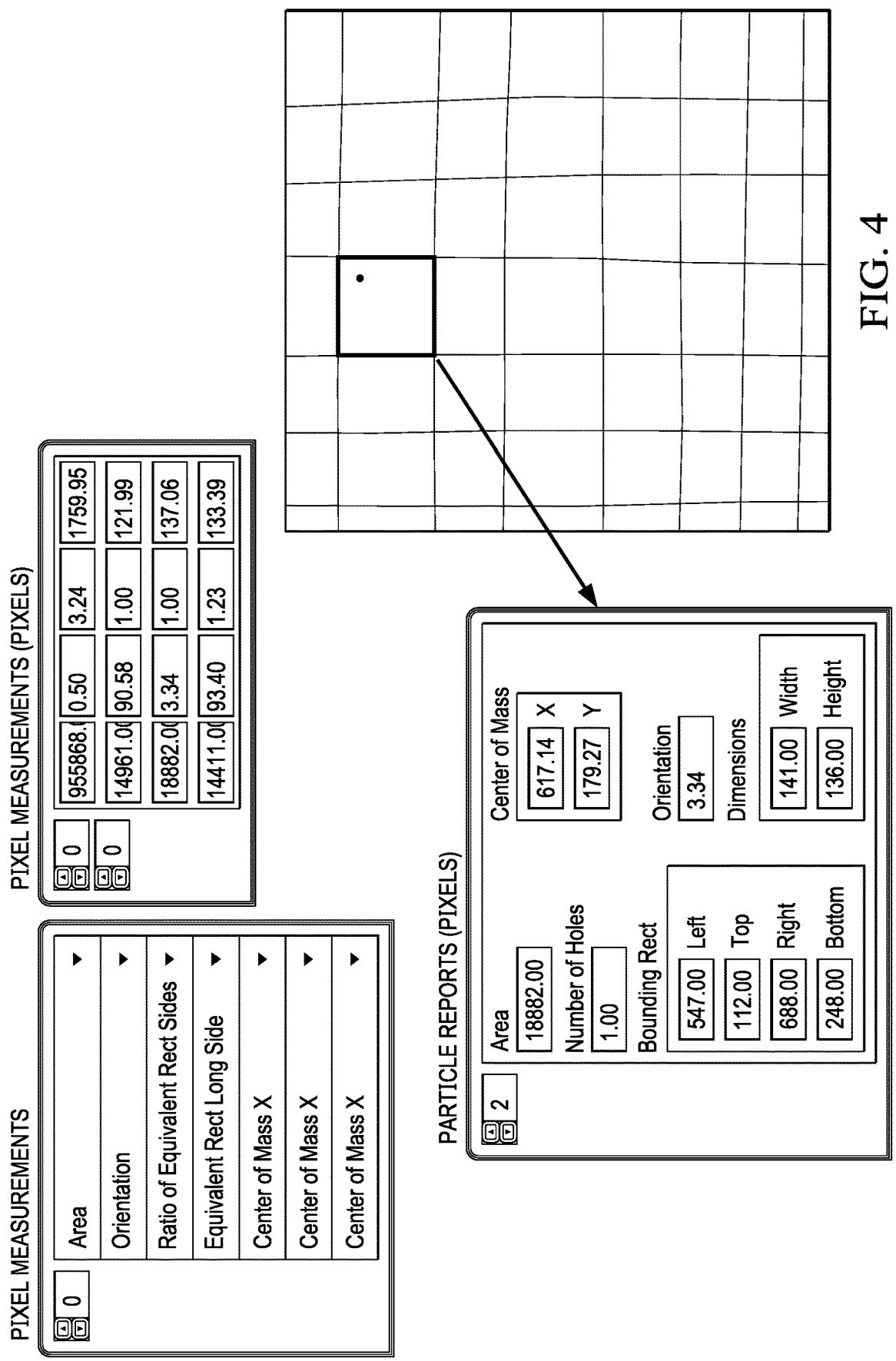
FIG. 4 illustrates an example of how a pattern signature can be analyzed for fabric location purposes.

FIG. 4 illustrates an example of using pattern zones to compute area and centroid locations. Here, the pattern is a grid pattern for the UV-signatures. Various grid cell features, such as centroid, size, area, and orientation, may be calculated and used for automated tension control to reduce distortion.

What is claimed is:

1. A method of using an automated system to position a fabric piece, comprising:
   printing a pattern onto the fabric piece with fluorescent ink;
   detecting the fluorescent ink on the fabric piece, thereby acquiring a pattern signature;
   storing the pattern signature in a control process of the automated system as a target pattern associated with a desired location of the fabric piece;
   staging the fabric piece such that the fabric piece is moveable by the automated equipment;
   comparing the position of the pattern signature on the fabric piece with the target pattern; and
   using the results of the comparing step to generate control signals for the automated system to move the piece into the position of the target pattern.

2. The method of claim 1, wherein the detecting step is performed with an ultraviolet camera.

3. The method of claim 1, wherein the printing step is performed with an inkjet printer.

4. The method of claim 1, wherein the pattern is the pattern for a sewn seam.

5. The method of claim 1, wherein the pattern is a grid pattern.

6. The method of claim 1, further comprising the step of analyzing the pattern signature prior to the comparing step, to improve the pattern signature.

7. A method of using an automated system to position a fabric piece, comprising:
   printing a pattern onto the fabric piece with fluorescent ink;
   detecting the fluorescent ink on the fabric piece, thereby acquiring a pattern signature;
   storing the pattern signature in a control process of the automated system as a target pattern associated with a desired location of the fabric piece;
   staging the fabric piece such that the fabric piece is moveable by the automated equipment;
   comparing the position of the pattern signature on the fabric piece with the target pattern; and
   using the results of the comparing step to generate control signals for the automated system to apply tension to the fabric, thereby reducing substrate distortion.

8. The method of claim 7, wherein the detecting step is performed with an ultraviolet camera.

9. The method of claim 7, wherein the printing step is performed with an inkjet printer.

10. The method of claim 7, wherein the pattern is the pattern for a sewn seam.

11. The method of claim 7, wherein the pattern is a grid pattern.

12. The method of claim 7, further comprising the step of analyzing the pattern signature prior to the comparing step, to improve the pattern signature.

13. A control system for use with an automated fabric positioning system, comprising:
- a printer operable to print a pattern onto a fabric piece with fluorescent ink;
- a camera operable to detect the fluorescent ink on the fabric piece, thereby acquiring a pattern signature;
- a controller operable to store the pattern signature as a target pattern associated with a desired location of the fabric piece; to compare the position of the pattern signature on the fabric piece with the target pattern; and to use the results of the comparing step to generate control signals for the automated fabric positioning system to move the piece into the position of the target pattern.

14. The control system of claim 13, wherein the camera is an ultraviolet camera.

15. The control system of claim 13, wherein the printer is an inkjet printer.

16. The control system of claim 13, wherein the pattern is the pattern for a sewn seam.

17. The control system of claim 13, wherein the pattern is a grid pattern.

18. The control system of claim 13, wherein the controller is further operable to analyze the pattern signature after receiving the pattern signature from the camera, to improve the pattern signature.

\* \* \* \* \*

UNITED STATES PATENT AND TRADEMARK OFFICE
CERTIFICATE OF CORRECTION

| | | |
|---|---|---|
| PATENT NO. | : 11,807,021 B2 | Page 1 of 1 |
| APPLICATION NO. | : 17/584595 | |
| DATED | : November 7, 2023 | |
| INVENTOR(S) | : Stephen Wiedmann et al. | |

It is certified that error appears in the above-identified patent and that said Letters Patent is hereby corrected as shown below:

On the Title Page

Item (72), in the Inventors Section, please list the inventors as follows:
Inventors: Stephen Wiedmann, San Antonio, TX (US), Victoria Wahlen, San Antonio, TX (US), Branson Brockschmidt, San Antonio, TX (US), Michael Ripperger, San Antonio, TX (US)

Signed and Sealed this
Eleventh Day of March, 2025

Coke Morgan Stewart
*Acting Director of the United States Patent and Trademark Office*